June 3, 1952 R. S. FINN 2,599,245
METHOD AND APPARATUS FOR SEISMIC PROSPECTING
Filed June 27, 1947
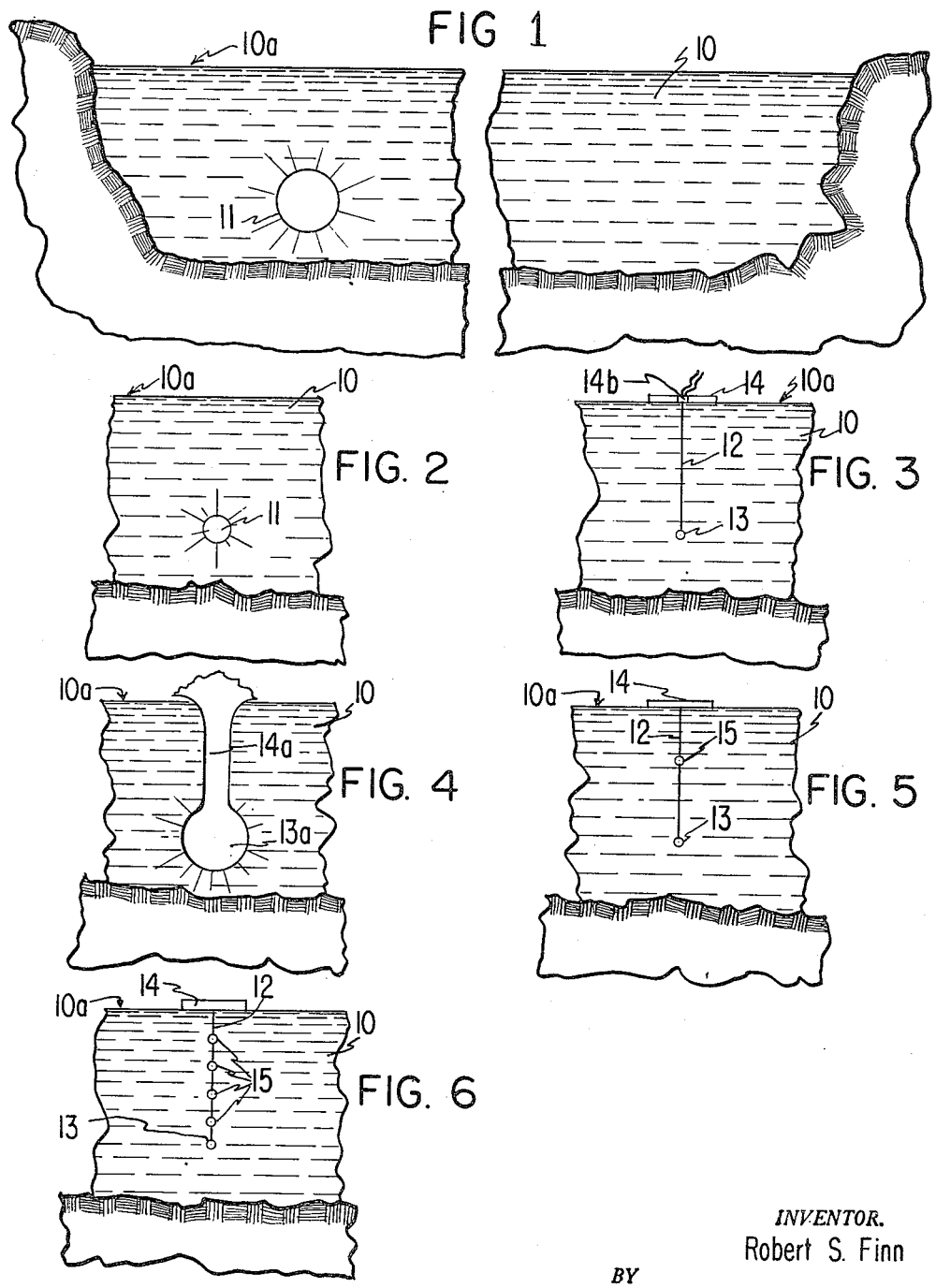
INVENTOR.
Robert S. Finn
BY
Richard D. Mason
Attorney Patented June 3, 1952

2,599,245

UNITED STATES PATENT OFFICE 2,599,245

METHOD AND APPARATUS FOR SEISMIC PROSPECTING

Robert S. Finn, Tulsa, Okla., assignor to Seismograph Service Corporation, Tulsa, Okla., a corporation of Delaware Application June 27, 1947, Serial No. 757,485

12 Claims. (Cl. 181—.5)

The present invention relates to methods and apparatus for geophysical prospecting over water-covered areas and more particularly to improved methods and apparatus for generating seismic waves beneath the surface of a body of water.

Seismic methods of geophysical prospecting involve the use of explosive charges at a succession of shot points to generate seismic waves which are propapated downward through the earth from each shot point and then reflected and refracted from strata interfaces and the like in the earth to a plurality of wave detectors laterally displaced from the shot point. In practicing such methods over water-covered areas, it is necessary to detonate each explosive charge beneath the surface of the water in order to obtain effective utilization of the explosive energy developed. This gives rise to the problem of suppressing or preventing the generation of unwanted so-called secondary and following P waves which are normally generated at short intervals after the desired so-called primary P waves. It is believed that the unwanted (non-primary) P waves are caused by the collapse and initial reformation of the substantially spherical cavity formed in the water when the explosion takes place at such a depth that there is no surface blow-out above the charge, and also by the compression and expansion of the gas released by the shot as this gas rises to the surface. Some authorities believe and certain tests have indicated that the secondary and following P waves are not generated if the explosion is controlled to produce a non-spherical cavity in the water. Regardless of the validity of this theory, when the secondary and following P waves are generated, they travel with substantially the same velocity as the primary P waves. This gives rise to several problems. One problem arises from the fact that the secondary and following P waves may produce reflections from one subsurface horizon which are detected by the detectors at a time which could mistakenly be interpreted as the arrival time of primary wave reflections from a deeper horizon. Also, the non-primary wave reflections from the shallower horizon may arrive at the detectors at the same time as primary wave reflections from a deeper horizon if the relative depths of the two horizons happen to be right, with the result that a confused reflection record is obtained. Further, direct transmission of the non-primary P waves to the detectors may interfere with concurrently arriving and desired primary wave reflections from a sub-surface horizon, thereby producing confusion of the reflection record.

It is an object of the present invention, therefore, to obviate the problem outlined above in the generation of seismic waves beneath the surface of a body of water.

It is another object of the invention to provide an improved method and improved apparatus for effectively generating seismic waves beneath the surface of a body of water without generating undesired non-primary P waves.

According to still another object of the invention, maintenance of critical relationships between the size and type of explosive charge and the depth of the charge in the water is avoided in the present improved apparatus and method, while achieving the desired end of preventing the generation of non-primary P waves.

It is a further object of the invention to increase the seismic efficiency per unit charge of explosive used in the generation of seismic waves beneath the surface of a body of water.

It is another object of the invention to provide apparatus for generating seismic waves beneath the surface of a body of water which is so arranged that a non-spherical cavity is formed in the water incident to detonation of the explosive charge of the apparatus.

The invention, both as to its organization and method of operation, together with further objects and advantages thereof, will best be understood by reference to the following specification taken in connection with the accompanying drawings, in which:

Fig. 1 is a fragmentary sectional view taken vertically through a body of water illustrating the gas bubble which is formed when an explosive is fired at a depth sufficient to prevent the compressed gases from escaping;

Fig. 2 is a fragmentary sectional view illustrating the collapse of the bubble shown in Fig. 1;

Fig. 3 is a fragmentary sectional view through a body of water illustrating one embodiment of the present invention;

Fig. 4 is a view similar to Fig. 3 illustrating the manner in which the water is displaced upon detonation of the apparatus shown in Fig. 3; and Figs. 5 and 6 are vertical sectional views illustrating modified embodiments of apparatus characterized by the features of the present invention.

Referring now to the drawings and more particularly to Figs. 1 and 2 thereof, the manner in which desired primary P waves and undesired secondary P waves are successively generated in response to detonation of an explosive charge is there illustrated. Specifically, the charge is located at a point 11 well below the surface 10a of a body of water 10 at a depth such that the gases developed upon detonation of the charge cannot immediately escape through the overlying layer of water. Immediately incident to detonation of the charge, the explosive forces give rise to the generation of the desired primary P waves, a portion of which are propagated downwardly through the water and the underlying subsurface structure for reflection and refraction from subsurface horizons to conventional seismic wave detectors, not shown, laterally displaced from the shot point in the customary manner. After these waves are generated, the gas bubble 11 formed in the body of water at the shot point starts to collapse. Collapsing of this bubble is accelerated by the action of the pressure developed in the water surrounding the bubble incident to detonation of the explosive charge. After collapsing a certain amount the bubble starts to reexpand and in so doing generates the undesired secondary P waves. The subsequent action is somewhat oscillatory in the sense that the gas bubble continues to collapse and expand repetitively to produce additional undesired P waves. However, as the phenomenon proceeds the magnitude of the waves rapidly decreases and beyond the fourth impulse the waves usually become unobjectionable. The P waves generated during the second, third and fourth impulses, however, are propagated downward at the same velocity as the primary P waves and are of sufficient magnitude to produce the undesired results referred to above.

In accordance with the present invention, the problem referred to in the preceding paragraph is obviated by interposing at least one auxiliary explosive charge between the surface 10a of the water and the main explosive charge located well beneath the surface of the water, detonating the main charge and simultaneously detonating the auxiliary charge to open the gas escape path between the surface of the water and the exploding main charge. This permits the gases from the exploding main charge to escape through the gas escape path and thus prevents formation of the gas bubble, the collapse of which gives rise to generation of the undesired non-primary P waves. In the embodiment of the invention illustrated in Fig. 3 of the drawing, the auxiliary explosive charge is in the form of an elongated explosive fuse 12, in the form of Primacord or the like, which serves the triple function of supporting the main explosive charge 13, from a float 14 located at the surface of the water, at the desired depth below the water's surface, exploding the charge 13, and opening the desired gas escape path between the explosion zone of the main charge 13 and the surface of the water. This elongated fuse may be attached to the container for the main charge 13 and to the float 14 in any desired or conventional manner. It will be understood, moreover, that if additional support for the main charge 13 is required, such support may be derived by paralleling the fuse 12 with a suitable supporting cord. Any form of float 14, such, for example, as a block of wood of appropriate size or a sealed hollow container, may be used to support the charge 13 from the surface of the body of water. Preferably, the explosive fuse 12 is connected to this float at the approximate center thereof and a suitable ignition cap 14b is joined to the end of the fuse to ignite the same when electrically excited in the customary manner from a remote point.

With the described apparatus positioned in the manner illustrated in Fig. 3 of the drawings, the elongated fuse 12 and the main charge 13 are substantially simultaneously detonated incident to energization of the ignition cap 14b. As the main charge 13 explodes, the desired primary P waves are generated and a large gas bubble is formed within the body of water 10 in the manner illustrated in Fig. 4 of the drawings. Concurrently therewith and as a result of the explosive forces developed by detonation of the fuse 12, the water is forced away from the exploding fuse in all directions so that a gas escape path or channel 14a of relatively small diameter is formed between the surface 10a of the water and the explosion zone or gas bubble 13a of the exploding main charge. The compressed gases escape to the water's surface through this channel and due to the pressures developed, prevent the channel from closing until the bubble has almost completely vanished or disappeared. Since this bubble is prevented from forming, non-primary P waves are not generated to produce the objectionable effects referred to above.

In the modified embodiments of the invention illustrated in Figs. 5 and 6 of the drawings, one or a plurality of small auxiliary charges 15 are used in conjunction with the explosive fuse 12 to open the gas escape path between the explosion zone of the main charge 13 and the surface of the water concurrently with the detonation of the main charge. When one or more small auxiliary charges is used, it may be required to employ an explosive fuse 12 to interconnect the several charges and to support the same from the float 14. As an alternative, ignition wires extending downward from the float 14 to detonating caps individual to the plurality of charges 13 and 15 may be employed to support these charges at the desired depths below the float 14. Preferably, however, an explosive fuse 12 of the Primacord type is employed for this purpose since it enhances the simplicity of the overall combination.

The mode of operation of the auxiliary charges 15, operated either with or without an explosive ignition fuse 12 of the Primacord type, to open a gas escape path between the explosion zone of the main charge 13 and the water's' surface is substantially the same as explained above with reference to the arrangement illustrated in Fig. 3 of the drawings and as will be readily apparent from the foregoing explanation. In this regard it may be pointed out that one of the problems involved is that of preventing the gas escape path 14a from closing prematurely, i. e., before the compressed gases generated incident to detonation of the main charge are permitted to escape to the water's surface. The problem may conveniently be solved by employing ignition caps individual to the main charge 13 and the auxiliary charges 15 and by using a conventional commutating device to energize the ignition caps of the auxiliary charges 15 either together or in succession a short time interval after the igniting of the main charge cap so that the main charge is detonated ahead of the auxiliary charges. This method of shooting the charges has the added advantages that no escape path is formed to the main charge until after the initial impulse energy resulting from detonation of the main charge is released. It should be noted, however, that the delay interval separating firing of the main charge and firing of the auxiliary charges should be short enough to insure opening of the desired gas escape path before the initial collapse of the main charge bubble is completed and preferably while such initial collapsing of the main charge bubble is in progress.

Another method of solving the above-mentioned problem is that of employing explosive in the auxiliary charge or charges 15 which are of lower velocity, i. e., slower burning, than the explosive material making up the main charge 13 so that the explosive forces developed by the small auxiliary charge or charges 15 are produced an instant after complete detonation of the main charge 13. This insures that the gas escape path will be opened a short time interval after the gas bubble 13a is formed incident to detonation of the main charge 13 and insures substantially complete escape of the gases in this bubble to the water's surface. This arrangement has the additional advantage of insuring maximum effectiveness of the explosive forces developed incident to detonation of the main charge 13 in producing the desired primary P waves.

The problem referred to in the preceding paragraph may also be solved with the Fig. 3 arrangement by locating the ignition cap for the explosive fuse 12 and the main charge 13 at the junction point between the two last named elements and paralleling the fuse 12 with ignition wires extending downwardly to the ignition cap supported by the main charge 13. As thus arranged, the explosive fuse 12 is detonated from the bottom end to its top end so that a progressive delay occurs in the formation of the gas escape channel to the water's surface upon the explosion of the main charge 13. In this regard it is again pointed out that the delay required is very small since all that is necessary is to prevent the gas escape path from closing until such time as the highly compressed gases of the gas bubble 13a are permitted to escape to the water's surface.

From the foregoing explanation it will be understood that the present improved method provides a simple and effective solution to the problem of preventing non-primary P waves from being generated incident to the detonation of an explosive charge beneath the surface of a body of water. Further, the solution is such that critical relationships between the material and size of the main charge and the depth of this charge beneath the water's surface are avoided. Thus since a gas escape opening is produced between the explosion zone of the main charge and the water's surface regardless of the depth at which the main charge is placed in the body of water, such placement of the main charge may be predetermined as desired to produce maximum effectiveness of the explosive forces in generating the desired primary P waves. Aside from the above, it will also be understood that the arrangement employed is simple in the extreme and that each unit of equipment may be easily assembled and handled in the placement of the unit at the desired shot points.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. The method of generating seismic waves beneath the surface of a body of water while substantially preventing the generation of undesired non-primary waves, which comprises interposing at least one auxiliary explosive charge between the surface of the water and a main charge, detonating said main charge to generate the desired waves, and detonating said auxiliary charge to open a gas escape path between the surface of the water and the exploding main charge.

2. The method of generating seismic waves beneath the surface of a body of water while substantially preventing the generation of undesired non-primary waves, which comprises supporting an explosive charge beneath the surface of the water by utilizing an elongated explosive fuse to suspend the charge from a float located at the surface of the water, detonating said charge to generate the desired waves and detonating said fuse to open a gas escape path between the surface of the water and the exploding charge.

3. The method of generating seismic waves beneath the surface of a body of water while substantially preventing the generation of undesired non-primary waves, which comprises supporting an explosive charge beneath the surface of the water by an elongated element attached to a float at the water's surface, supporting at least one small auxiliary charge along said element at a point intermediate the ends thereof, detonating said first-mentioned charge to generate the desired waves, and detonating said auxiliary charge to open a gas escape path between the surface of the water and the explosion zone of said first-mentioned charge.

4. The method of generating seismic waves beneath the surface of a body of water while substantially preventing the generation of undesired non-primary waves, which comprises supporting an explosive charge beneath the surface of the water by an elongated fuse element attached to a float at the water's surface, supporting at least one auxiliary charge along said element at a point intermediate the ends thereof, detonating said first-mentioned charge to generate the desired waves, and detonating said fuse and auxiliary charge to open a gas escape path between the surface of the water and the explosion zone of said first-mentioned charge.

5. Apparatus for generating seismic waves beneath the surface of a body of water while substantially preventing the generation of undesired waves, comprising a float, an explosive charge, an elongated fuse for suspending said explosive charge from said float beneath the surface of the water and for opening a gas escape path between the surface of the water and the explosion zone of the charge upon detonation thereof, and means for detonating said fuse and said charge.

6. Apparatus for generating seismic waves beneath the surface of a body of water while substantially preventing the generation of undesired waves, comprising a float, an explosive charge, an elongated element for suspending said explosive charge from said float beneath the surface of the water, at least one auxiliary explosive charge supported by said element intermediate the ends of said element for opening a gas escape path between the surface of the water and the explosion zone of said first-mentioned charge upon detonation of said charges, and means for detonating said charges.

7. Apparatus for generating seismic waves beneath the surface of a body of water while substantially preventing the generation of undesired waves, comprising a float, an explosive charge, an enlongated explosive fuse for suspending said explosive charge from said float beneath the surface of the water, at least one auxiliary explosive charge supported by said element intermediate the ends of said element, said fuse and said auxiliary charge being operative upon detonation thereof to open a gas escape path between the surface of the water and the explosion zone of said first-mentioned charge, and means for igniting said fuse, thereby to detonate said fuse and said charges.

8. The method of generating seismic waves beneath the surface of a body of water while substantially preventing the generation of undesired non-primary waves, which comprises positioning a main charge and an auxiliary smaller charge in the body of water with said auxiliary charge disposed between said main charge and the surface of the water, exploding said main charge to generate the desired waves, exploding said auxiliary charge to open a gas escape path between the surface of the water and the exploding main charge, and delaying explosion of said auxiliary charge for a short interval after explosion of said main charge to insure that said gas escape path will not close before the gases from said exploding main charge escapes to the surface of the water.

9. The method of generating seismic waves beneath the surface of a body of water while substantially preventing the generation of undesired non-primary waves, which comprises positioning a main charge and an auxiliary smaller charge in the body of water with said auxilary charge disposed between said main charge and the surface of the water, and exploding said main and auxiliary charges in sequence and in the order named, whereby said exploding main charge generates the desired waves and said exploding auxiliary charge opens a gas escape path between the surface of the water and the exploding main charge which remains open until substantially all of the gases from the exploding main charge escape to the surface of the water.

10. The method of generating seismic waves beneath the surface of a body of water while substantially preventing the generation of undesired nonprimary waves, which comprises positioning a main charge and an auxiliary smaller charge in the body of water with said auxiliary charge disposed between said main charge and the surface of the water, said auxiliary charge having slower burning characteristics than said main charge, exploding said main charge to generate the desired waves, and exploding said auxiliary charge to open a gas escape path between the surface of the water and the exploding main charge, the slower burning characteristics of said auxiliary charge delaying explosion of said auxiliary charge for a short interval after explosion of said main charge to insure that said gas escape path will not close before the gases from said exploding main charge escape to the surface of the water.

11. In a method for seismic exploration wherein an explosive is fired below the surface of a body of water, the method of preventing generation of secondary seismic impulses while generating primary seismic waves which comprises placing a primary charge and at least one secondary charge of explosive below the surface of the water, spacing said secondary charge from said primary charge at an effective distance such that the cavities formed in the water by exploding said primary and secondary charges will mutually distort each other, and simultaneously firing said primary and secondary charges.

12. A method in accordance with claim 11 in which said primary and secondary charges are suspended in a substantially vertical column beneath the surface of the body of water.

ROBERT S. FINN.

REFERENCES CITED

The following references are of record in the file of this patent:

UNITED STATES PATENTS

| Number | Name | Date |
|---|---|---|
| 87,372 | Shaffner | Mar. 2, 1869 |
| 1,092,702 | Elia | Apr. 7, 1914 |
| 1,584,068 | Alexander | May 11, 1926 |
| 2,351,524 | Lay et al. | June 13, 1944 |